United States Patent [19]

Weyant

[11] 4,125,925

[45] Nov. 21, 1978

[54] METHOD OF MAKING DOOR

[76] Inventor: Romer G. Weyant, 81 Edgewater Dr., Elkhart, Ind. 46514

[21] Appl. No.: 843,726

[22] Filed: Oct. 19, 1977

Related U.S. Application Data

[60] Division of Ser. No. 763,363, Jan. 28, 1977, Pat. No. 4,064,655, which is a continuation of Ser. No. 623,031, Oct. 16, 1975, abandoned.

[51] Int. Cl.² .............................................. B23P 17/00

[52] U.S. Cl. .................................... 29/155 R; 29/445; 29/446

[58] Field of Search ..................... 29/445, 155 R, 446; 49/501; 52/291

[56] References Cited

U.S. PATENT DOCUMENTS

| | | | |
|---|---|---|---|
| 2,818,946 | 1/1958 | Noel et al. | 49/501 |
| 2,949,667 | 8/1960 | Cameron et al. | 29/445 X |
| 3,049,202 | 8/1962 | Sailor et al. | 52/291 |
| 3,092,396 | 6/1963 | Thomas | 29/155 R UX |
| 3,286,424 | 11/1966 | Weyant | 49/501 X |
| 3,300,839 | 1/1967 | Lichti | 29/155 R |
| 3,334,464 | 8/1967 | Charles | 49/501 X |
| 3,778,934 | 12/1973 | Fisher | 52/291 X |
| 3,842,462 | 10/1974 | Bainbridge | 52/291 X |
| 3,893,273 | 7/1975 | Sailor | 52/291 |

*Primary Examiner*—Charlie T. Moon

*Attorney, Agent, or Firm*—Olsen and Stephenson

[57] ABSTRACT

A light-weight sheet metal door for mobile homes, recreational vehicles, marine vessels and the like in which the bolt-edge of the door has a camber for maintaining a weather tight seal with the door frame. The edges of the door are defined by extruded metallic channel members, and the channel member defining the bolt-edge has been deflected beyond its elastic limit to provide the desired camber. The method of making the door includes the step of feeding the assembled door between forming elements to deflect the bolt-edge beyond the elastic limit of the associated channel member while maintaining the hinge-edge straight.

2 Claims, 11 Drawing Figures

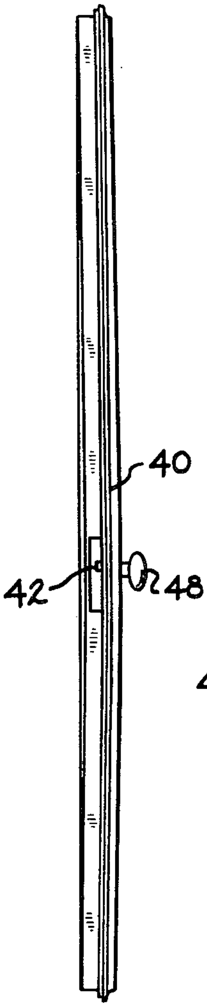
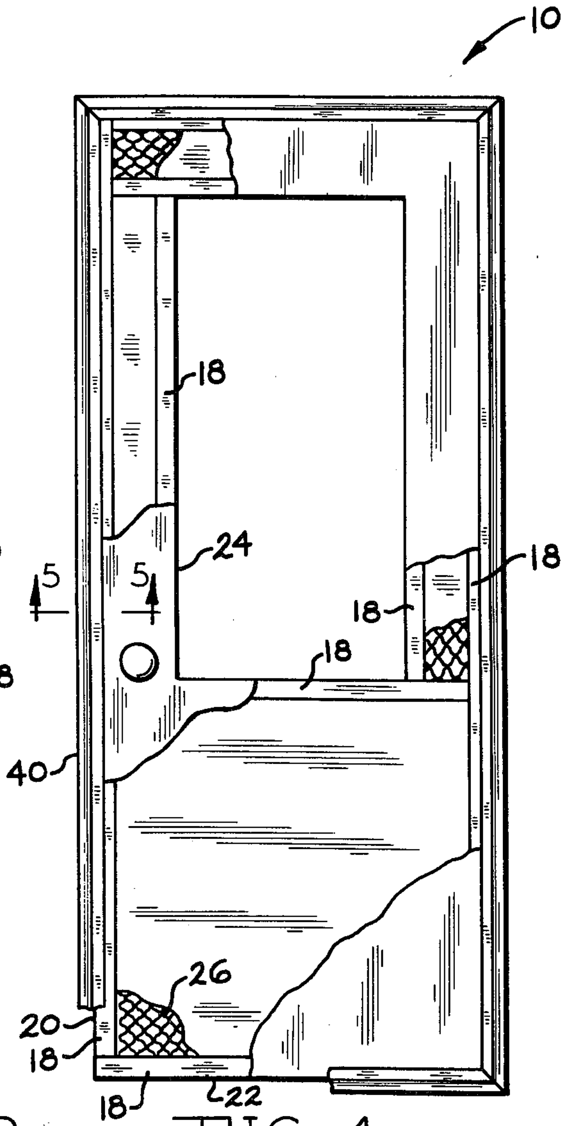
FIG. 2 FIG. 1 FIG. 3
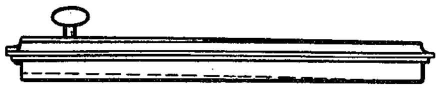
FIG. 4
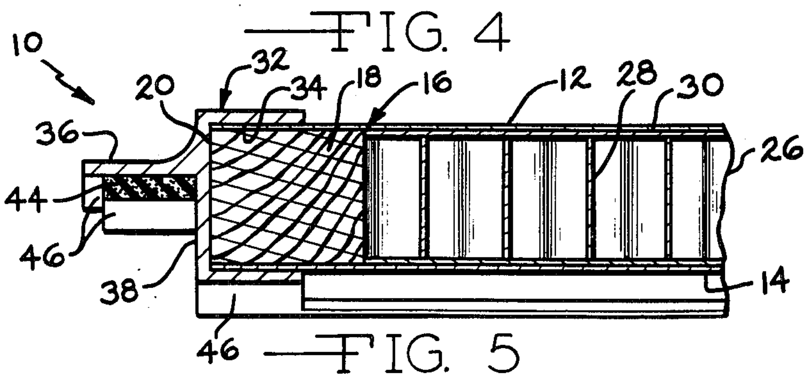
FIG. 5

METHOD OF MAKING DOOR

REFERENCE TO PENDING APPLICATIONS

This application is a division of pending application Ser. No. 763,363, filed Jan. 28, 1977, now U.S. Pat. No. 4,064,655 in the name of Romer G. Weyant, for "Door and Method of Making Same", and pending application Ser. No. 763,363 is a continuation of application Ser. No. 623,031, filed Oct. 16, 1975 in the name of Romer G. Weyant, for "Door and Method of Making Same", now abandoned.

BACKGROUND OF THE INVENTION

The present invention relates to improvements in a door for use in mobile homes, recreational vehicles, marine vessels and the like, and to a method of making the door.

It is known to provide a door construction which has a straight hinge-edge and a cambered bolt-edge, as is disclosed and explained, for example, in the prior U.S. Pat. Nos. 2,781,875; 2,818,946; 3,049,202; 3,286,424 and 3,778,934. While the door constructions disclosed in these patents have served the industry well, further improvements in door construction are required to meet the demands of the industry for lower cost doors that are light in weight and provide optimum weather sealing and insulation characteristics commensurate with their relatively low cost.

SUMMARY OF THE INVENTION

The present invention has overcome the inadequacies of the prior art and provides a door that is constructed so that it can be manufactured at minimal cost and which will then serve the functional needs of the building industry.

According to one form of the present invention, a rectangular door is provided having front and rear sheet metal panels in spaced relation, a core portion sandwiched between the sheet metal panels and on which the sheet metal panels are mounted, the core portion including wooden members defining the top, bottom and vertical side edges thereof, and U-shaped extruded metallic channel members extending around and enclosing the outer peripheries of the sheet metal panels and the wooden members sandwiched therebetween. The channel member enclosing one vertical edge of the core portion is cambered so that it is concave in the rearward direction of the door. The channel member enclosing the other vertical edge is straight. To provide an effective seal of the door with respect to the door frame, the channel member along each edge has a flange extending outwardly to provide a marginal recess for fitting into a door frame, the flange along the bolt edge of the door being cambered so that it will assure that a tight weather seal is provided around the periphery of the door when the latter is closed against the door frame. The resilient characteristics of the cambered channel member will then assure that a tight weather seal is provided around the door in the manner conventionally performed by the prior art door constructions of the type disclosed in the patents cited above.

For this purpose of providing a seal, the rear surface of the flange is provided with a continuous sealing strip secured thereto. Also, for thermal and sound insulation purposes, the core portion includes thermal and sound insulation material within the confines of the sheet metal panels and the wooden members. One suitable material for this purpose is conventional corrugated cardboard.

One method of forming the rectangular door includes the steps of fabricating the front and rear sheet metal panels with a core portion sandwiched therebetween, enclosing the full length of each edge within the recessed portion of U-shaped metallic channel members and securing the channel members in place to form a door having four straight edges boardered by the channel members, and feeding the door lengthwise between forming elements arranged to maintain the hinge-edge straight while bending the bolt-edge beyond the elastic limit of its channel member so as to provide a permanent camber of a desired magnitude in the bolt-edge.

In a preferred method of forming the door, the step of feeding the door lengthwise between forming elements comprises feeding a door between rollers arranged to engage the front and rear surfaces of the channel members defining the hinge-edge and the bolt-edge, the rollers at the hinge-edge maintaining a linear path for travel of the associated channel member, and the rollers at the bolt-edge maintaining an arcuate path for travel of the channel member associated with this edge.

Thus, it is an object of the present invention to provide an improved door characterised by its light weight, thermal and sound insulation properties, its desired configuration so that it provides a straight hinge-edge and a cambered bolt-edge, and its relatively low cost commensurate with providing the enumerated desirable characteristics. It is further an object of the present invention to provide a method of producing the door having the foregoing characteristics.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a front elevation of a door embodying the present invention, portions being broken away for illustration purposes;

FIG. 2 is a side elevation of the door of FIG. 1 as viewed from the left side, showing the bolt-edge;

FIG. 3 is a side elevation of the door of FIG. 1 as viewed from the right side, showing the hinge-edge;

FIG. 4 is a top plan view of the door illustrated in FIG. 1;

FIG. 5 is an enlarged fragmentary section taken on the lines 5—5 of FIG. 1;

DESCRIPTION OF THE PREFERRED EMBODIMENTS

Figure 6:
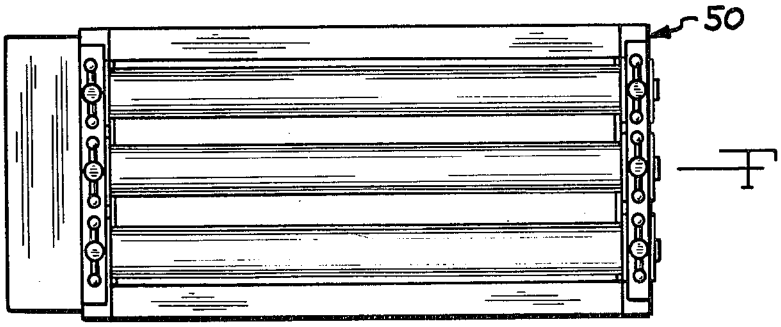
FIG. 6 is a top plan view of apparatus that may be used in carrying out the method of forming the door illustrated in FIGS. 1 to 5.
Figure 7:
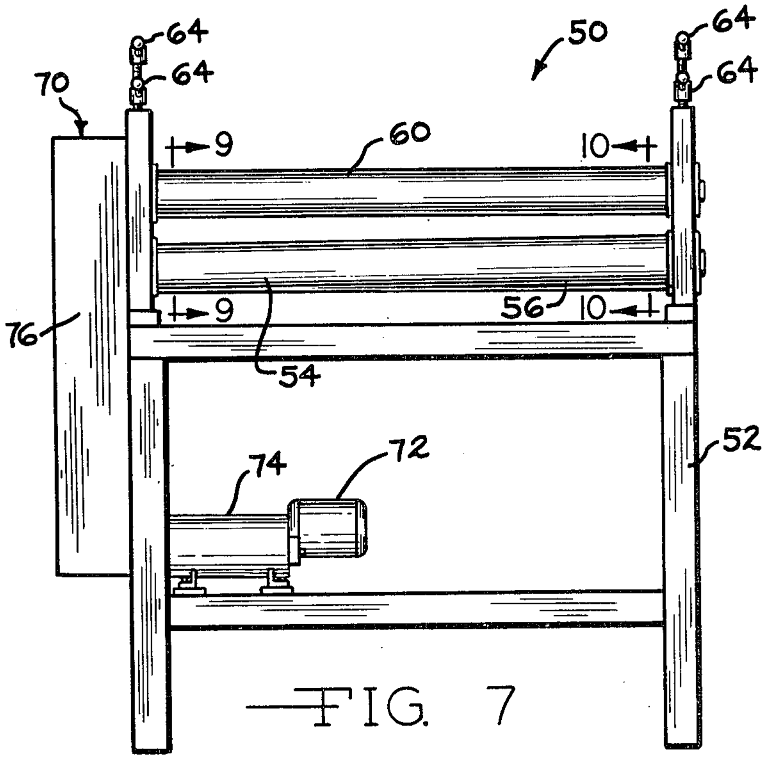
FIG. 7 is a front elevational view of the apparatus illustrated in FIG. 6.
Figure 8:
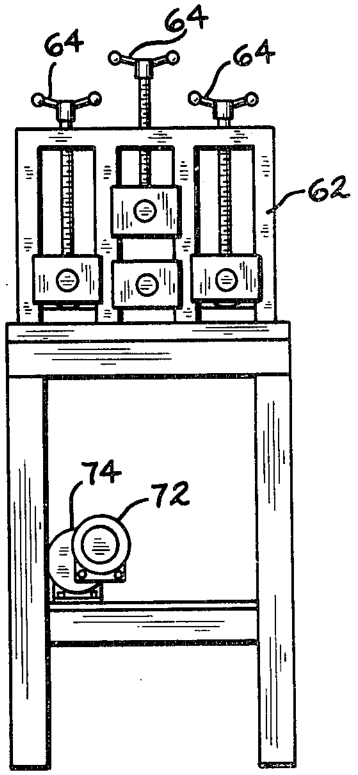
FIG. 8 is a side elevational view of the apparatus illustrated in FIG. 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

Referring now to the drawings, the description of the door illustrated in FIGS. 1 to 5 will initially be described. The rectangular door 10 has a front sheet metal panel 12 and a rear sheet metal panel 14 mounted in spaced parallel relationship on a core portion 16. The core portion 16 includes a plurality of wooden members 18 which define the top, bottom, and vertical side edges thereof, only the side edge 20 and the bottom edge 22 being visible in the drawings. The wooden members 18 also may be used to define an internal opening or window 24 in the central portion of the door 10. The core portion 16 preferably includes insulation material 26 which is retained within the confines of the sheet metal panels 12 and 14 and the wooden members 18. In the illustrated embodiment, the insulation material 26 is corrugated cardboard which provides a large number of voids within the compartments 28 that are closed on the front and rear sides by the paper material 30, thus providing both thermal and sound insulation in the known manner.

The entire outer periphery of the core portion 16 is enclosed within the U-shaped extruded metallic members 32 which provide a recessed portion 34 within which the edges of the core portion 18 are confined. Preferably, the metallic members 32 are extruded from aluminum material. The channel members 32 also have a flange 36 extending outwardly to provide a marginal recess at 38 for fitting into a door frame, not shown. The recessed portion 38 is adapted to fit into the door frame and the flange 36 is adapted to fit over an outer surface of the door frame to provide therewith a weather seal. As is known and is explained in the previously cited patents, an effective weather seal is provided when the door 10 is cambered along the bolt-edge 40 so that when the door latch or bolt 42 is closed in the keeper of the door frame, the continuous flange 36 will be urged into a straight condition tightly against the door frame. A weather seal 44 of flexible foam plastic or other suitable material is secured to the flange 36. The concave configuration of the flange 36 and the sealing material 44, as indicated at 46, results in a tight seal being achieved when the doorknob 48 is used to close the door 10 in the door frame in a manner to urge the bolt-edge 40 into a straight configuration against the elastic properties of the channel member 32, and the door 10 will be maintained in this stressed condition so long as the bolt 42 is in the keeper of the door frame.

Figure 9:
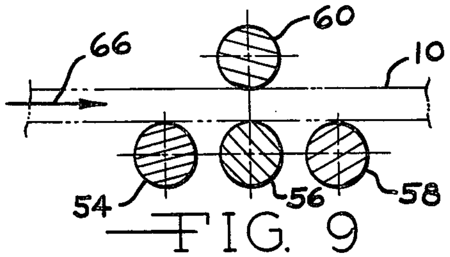
FIG. 9 is a fragmentary section taken on the lines 9—9, showing in phantom one stage of the passage of the hinge-edge of the door during the forming operation.
Figure 10:
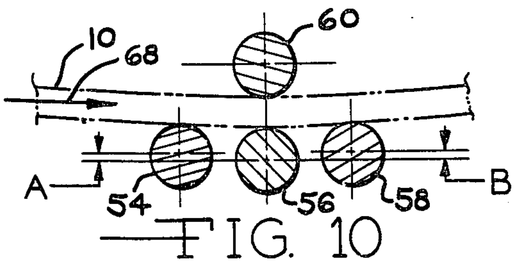
FIG. 10 is a fragmentary section taken from the lines 10—10 of FIG. 7, showing in phantom one stage of the passage of the bolt-edge of the door during the forming operation.

Referring now to FIGS. 6 to 11, apparatus and a method for forming the door 10 will be described. The door forming apparatus 50 comprises a frame 52 on which three lower rollers 54, 56 and 58 are mounted for rotation about their axes. A single roller 60 is mounted thereabove, similarly for rotation about its axis. The rollers 54, 56, 58 and 60 are mounted at the opposite ends in bearing blocks which can be raised and lowered in the guide rails 62 in response to turning of the adjustment screws 64. In the normal operation of forming the door 10, the adjustment screws 64, as viewed in FIG. 7 on the left end of the apparatus 50, are set so that the rollers 56 and 60 conform essentially to the spacing desired between the front and rear surfaces of the hinge-edge channel member 32. The rollers 54 and 58 are arranged, as shown in FIG. 9, so that their axes are in a common horizontal plane with that of the roller 56, thereby providing a horizontal and linear passageway for travel of the door 10 between the roller 60 and the lower rollers 54, 56 and 58 as seen by the arrow 66. The adjustment screws 64 at the right end of the apparatus 52 are adjusted so that the rollers 56 and 60 are spaced apart essentially the same distance as the rollers at the opposite end, but the rollers 54 and 58 are adjusted so that they are elevated the amounts shown at A and B in FIG. 10. This will result in the hinge-edge of door 10 traveling in an arcuate passageway in the direction of arrow 68. The amount of the dimensions A and B, which normally will be equal to one another, is an amount sufficient so that the channel member 32 at the bolt-edge 40 will be bent beyond its elastic limit so that after the door has passed between the rollers, it will have the desired camber.

Figure 11:
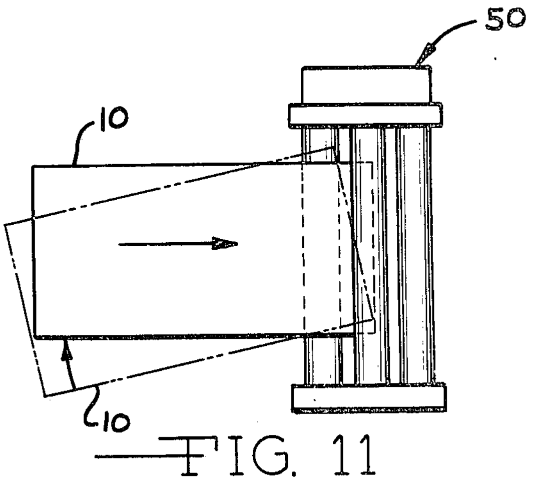
FIG. 11 is a top plan view in reduced scale showing two stages of the operation of feeding the door through the forming apparatus.

When manually feeding the door 10 through the apparatus 50, preferably, the door 10 will be introduced between the rollers 54, 56, 58 and 60 in the position shown in broken lines in FIG. 11 wherein one corner is initially introduced in feeding the door between the rollers. Thereafter, as the door advances it can be turned to the straight position shown by solid lines in this figure.

For the purpose of advancing the door 10 between the rollers 54, 56, 58 and 60, a suitable drive system 70 can be employed which includes the electric motor 72, a reduction gear system 74, and a drive train 76 which can be any conventional type of gear drive, belt drive, chain drive or the like which drivingly connects the rollers, or one of rollers 56 and 60 to the drive system. Details of the drive system will not be disclosed because any conventional and well known drive system for turning the rollers 54, 56, 58 and 60, or any suitable number of the same for the purpose of advancing the door 10 between the rollers can be utilized.

I claim:

1. A method of forming a rectangular door having front and rear sheet metal panels and in which the top edge, the bottom edge and the hinge-edge are straight and the bolt-edge is cambered, comprising the steps of fabricating the front and rear sheet metal panels with a core portion sandwiched therebetween, enclosing the full length of each edge within the recessed portion of a U-shaped metallic channel member and securing the channel members in place to form a door having four straight edges bordered by the channel members, and feeding the door lengthwise between forming elements arranged to maintain the hinge-edge straight while bending the bolt-edge beyond the elastic limit of its channel member so as to provide a permanent camber of desired magnitude in the bolt-edge.

2. The method of forming the rectangular door that is defined in claim 1, wherein the step of feeding the door lengthwise between forming elements comprises feeding the door between rollers arranged to engage the front and rear surfaces of the channel members defining the hinge-edge and the bolt-edge, the rollers at the hinge-edge maintaining a linear path for travel of the associated channel member, and the rollers at the bolt-edge maintaining an arcuate path for travel of the associated channel member.

* * * * *